United States Patent
Nakahara et al.

(10) Patent No.: US 12,214,733 B2
(45) Date of Patent: Feb. 4, 2025

(54) CAMERA UNIT INSTALLING METHOD, MOVING DEVICE, IMAGE PROCESSING SYSTEM, IMAGE PROCESSING METHOD, AND STORAGE MEDIUM

(71) Applicant: CANON KABUSHIKI KAISHA, Tokyo (JP)

(72) Inventors: Ikunari Nakahara, Kanagawa (JP); Tomoaki Tsuchiya, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 198 days.

(21) Appl. No.: 17/933,676

(22) Filed: Sep. 20, 2022

(65) Prior Publication Data

US 2023/0096414 A1    Mar. 30, 2023

(30) Foreign Application Priority Data

Sep. 24, 2021    (JP) ................. 2021-155782

(51) Int. Cl.
*B60R 11/04*    (2006.01)
*B60R 11/00*    (2006.01)
*H04N 23/57*    (2023.01)

(52) U.S. Cl.
CPC ............ *B60R 11/04* (2013.01); *H04N 23/57* (2023.01); *B60R 2011/004* (2013.01); *B60R 2300/105* (2013.01); *B60R 2300/303* (2013.01)

(58) Field of Classification Search
None
See application file for complete search history.

(56) References Cited

U.S. PATENT DOCUMENTS

| | | | |
|---|---|---|---|
| 2005/0083427 A1 | 4/2005 | Imoto | |
| 2013/0265442 A1* | 10/2013 | Maekawa | G06T 7/80 348/187 |
| 2022/0174254 A1* | 6/2022 | Lewin | B60R 11/04 |

FOREIGN PATENT DOCUMENTS

| | | | |
|---|---|---|---|
| JP | 2004345554 A1 | | 12/2004 |
| JP | 2007038856 A | * | 2/2007 |
| JP | 2010095202 A1 | | 4/2010 |
| JP | 2015-121591 A | | 7/2015 |
| WO | 2020/153317 A | | 7/2020 |

* cited by examiner

*Primary Examiner* — Rebecca A Volentine
(74) *Attorney, Agent, or Firm* — CANON U.S.A., INC. IP DIVISION (57) ABSTRACT

A method of installing a camera unit including an imaging device and an optical system that forms an optical image on a light receiving surface of the imaging device, wherein the light receiving surface includes a first area and a second area on a peripheral side of the first area, wherein an increase in an image height with respect to a unit half angle of view in the first area is larger than an increase in an image height with respect to a unit half angle of view in the second area, wherein the optical system and the imaging device are disposed such that the gravity center of the first area deviates in a first direction from the center of the light receiving surface, and wherein the method includes installing the camera unit such that the first direction is directed to an area other than a predetermined targeted area.

18 Claims, 7 Drawing Sheets

CAMERA UNIT INSTALLING METHOD, MOVING DEVICE, IMAGE PROCESSING SYSTEM, IMAGE PROCESSING METHOD, AND STORAGE MEDIUM

BACKGROUND

Field

The present disclosure relates to a camera unit installing method, a moving device, an image processing system, an image processing method, and a storage medium.

Description of the Related Art

Recently, there has been a demand for replacement of a room mirror (a rearview mirror) mounted in a vehicle with an electronic rearview mirror. For example, Japanese Unexamined Patent Application Publication No. 2010-95202 discloses an electronic rearview mirror system that includes an imaging device with a rear outside of a vehicle as an imaging area and a display unit in the vehicle and that allows a driver to ascertain a rear view of the vehicle by displaying an image captured by the imaging device on a display in the vehicle.

On the other hand, there is known a rear confirmation system that allows a driver to confirm a blind spot behind a vehicle at the time of rearward movement of the vehicle. Japanese Unexamined Patent Application Publication No. 2004-345554 discloses a rear confirmation system that allows a driver to confirm a blind spot behind a vehicle at the time of rearward movement of the vehicle by installing a camera such that it images the rear outside of the vehicle and displaying a captured image in a cabin of the vehicle.

A camera which is the imaging device that captures an image for the electronic rearview mirror is required to have a high resolution such that a driver can more accurately confirm a relatively far rear view. On the other hand, a camera for the rearview confirmation system is required to image a broader range such that a driver can confirm safety in a broader area including rear blind spots or rear-lateral angles of the vehicle to avoid collision at the time of rearward movement or the like.

When an electronic rearview mirror system and a rear confirmation system are mounted in a vehicle together, individual provision of a camera for the electronic rearview mirror system and a camera for the rear confirmation system in the vehicle makes an onboard image processing system complicated. This disadvantage is similarly caused, for example, in an automated driving system that performs automated driving or the like by disposing a plurality of cameras to image surrounding situations of a vehicle.

On the other hand, for example, by employing a camera using a special super-wide-angle lens, it is possible to reduce the number of cameras which are installed in a vehicle. However, when a super-wide-angle lens or the like is used, although a wide viewing angle is obtained, distortion of a peripheral part is large and adjustment of installation positions or postures is difficult. There is a disadvantage in that a processing load for distortion correction of a super-wide-angle lens with a complicated shape is large.

SUMMARY

Therefore, an objective of the present disclosure is to provide a camera unit installing method that can facilitate settings or the like of a viewing angle in consideration of the aforementioned circumstances.

In order to achieve the aforementioned objective, according to an aspect of the present disclosure, there is provided a method of installing a camera unit including an imaging device and an optical system that forms an optical image on a light receiving surface of the imaging device, wherein the light receiving surface includes a first area and a second area on a peripheral side of the first area, wherein an increase in an image height with respect to a unit half angle of view in the first area is larger than an increase in an image height with respect to a unit half angle of view in the second area, and wherein the optical system and the imaging device are disposed such that the gravity center of the first area deviates in a first direction from the center of the light receiving surface, and wherein the method includes installing the camera unit such that the first direction is directed to an area other than a predetermined targeted area.

Further features of the present disclosure will become apparent from the following description of embodiments with reference to the attached drawings.

DESCRIPTION OF THE EMBODIMENTS

Hereinafter, with reference to the accompanying drawings, aspects of the present disclosure will be described with reference to example embodiments. In each diagram, the same reference signs are applied to the same members or elements, and duplicate description will be omitted or simplified.

First Embodiment

Figure 1:
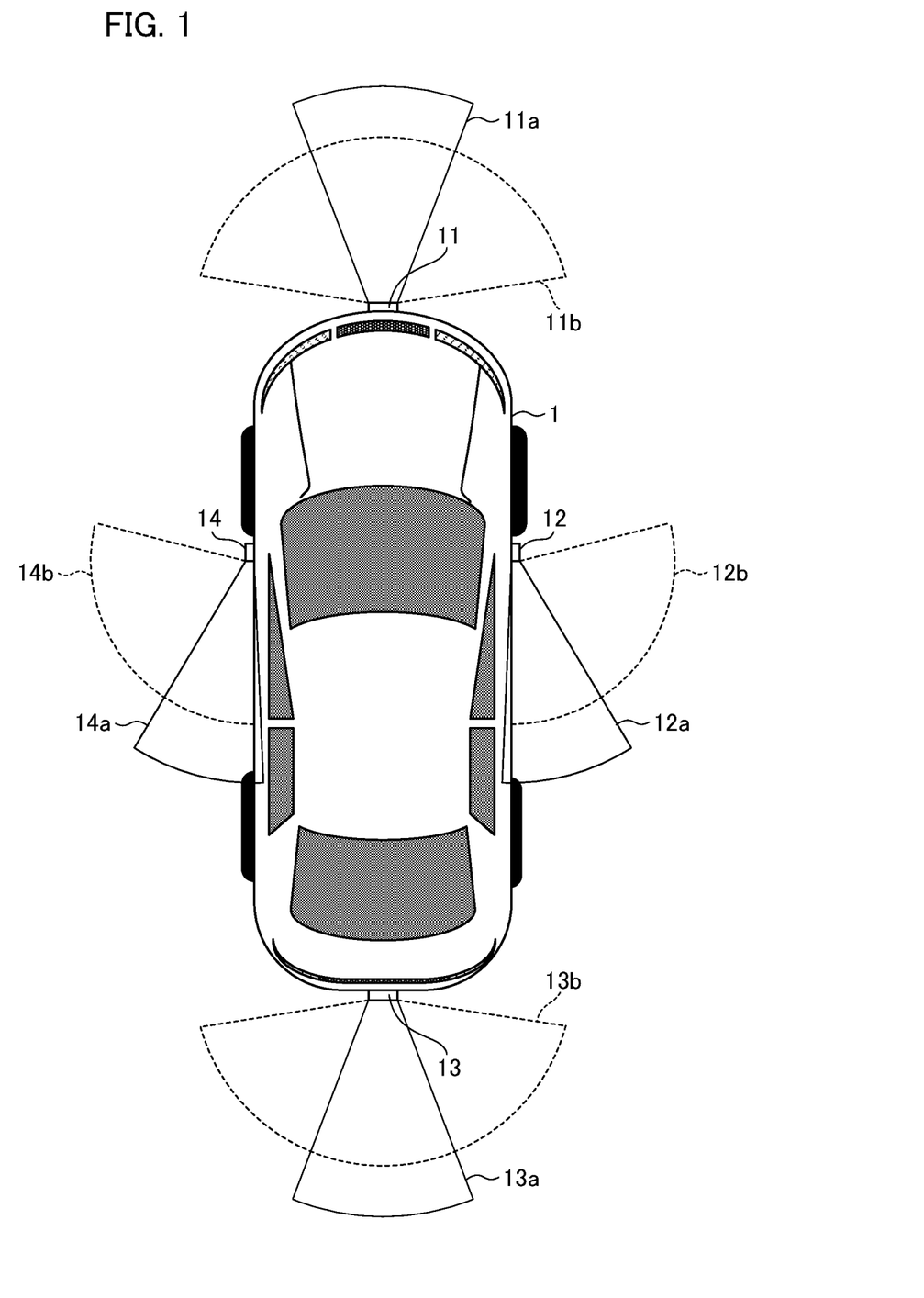
FIG. 1 is a diagram illustrating positional relationships between camera units and a vehicle according to a first embodiment.

In a first embodiment, an image processing system that can perform both display for an electronic rearview mirror with high precision and display for ascertainment of surroundings of a vehicle such as a wide rear of the vehicle using a small number of cameras and optimize assignment of a viewing angle will be described below. FIG. 1 is a diagram illustrating a positional relationship between camera units and a vehicle according to the first embodiment.

In the first embodiment, as illustrated in FIG. 1, camera units 11, 12, 13, and 14 are installed, for example, on front, right, rear, and left sides of a vehicle 1 which is a mobile object (a mobile object body), respectively. In the first embodiment, four camera units are provided, but the number of camera units is not limited to four and at least one camera unit may be provided.

The camera units 11 to 14 are installed to image a front area, a right area, a left area, and a rear area of the vehicle 1 which is a mobile object as imaging areas. In the first embodiment, the camera units 11 to 14 have substantially the same configuration, each including an imaging device that captures an optical image and an optical system that forms an optical image on a light receiving surface of the imaging device.

For example, optical axes of the optical systems provided in the camera units 11 and 13 are provided to be substantially horizontal, and optical axes of the optical systems provided in the camera units 12 and 14 are provided to be directed slightly downward from the horizontal plane or to face straight down.

The optical systems provided in the camera units 11 to 14 used in the first embodiment are configured to acquire a high-resolution image at a narrow viewing angle around the optical axis and to acquire to a low-resolution image at a wide viewing angle. Reference numerals 11a to 14a denote imaging viewing angles at which a low-distortion image can be captured with a high resolution, and reference numerals 11b to 14b denote imaging viewing angles at which a high-distortion image can be captured with a low resolution.

The optical systems of the camera units 11 to 14 according to the first embodiment will be described below with reference to FIG. 2. Characteristics of the optical systems of the camera units 11 to 14 may not be the same, but in the first embodiment, it is assumed that the optical systems of the camera units 11 to 14 have substantially the same characteristics, and the optical system provided in the camera unit 11 will be exemplified below.

Figure 2A:
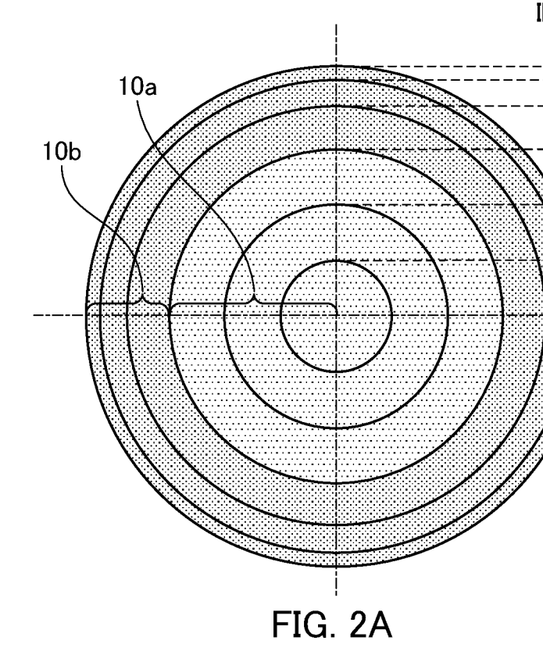
FIG. 2A and FIG. 2B are diagrams illustrating optical characteristics of an imaging unit according to the first embodiment.
Figure 2B:
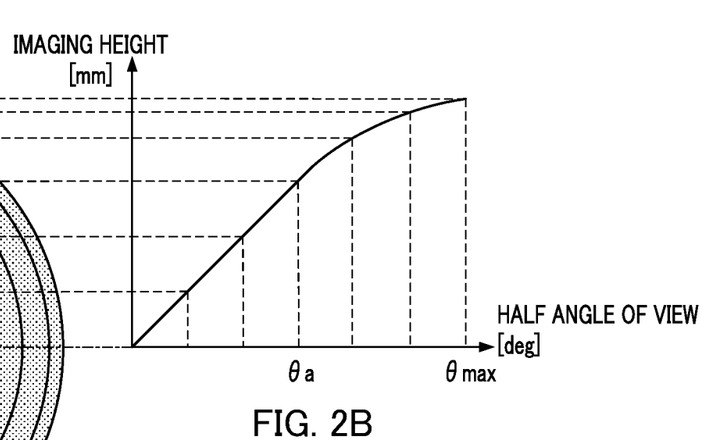

FIG. 2A and FIG. 2B are diagrams illustrating optical characteristics of an imaging unit in the first embodiment of the present disclosure, where FIG. 2A is a diagram illustrating an image height y at half angle of view on the light receiving surface of the imaging device of the optical system provided in the camera unit 11 according to the first embodiment in a shape of contour lines.

FIG. 2B is a diagram illustrating projection characteristics indicating a relationship between an image height y and a half angle of view θ in the optical system provided in the camera unit 11 according to the first embodiment. In FIG. 2B, a half angle of view (an angle formed by an optical axis and incident light) θ is defined as the horizontal axis, and an imaging height (image height) y on a sensor surface (an image surface) of the camera unit 11 is defined as the vertical axis.

The optical system provided in the camera unit 11 according to the first embodiment is configured such that a projection characteristic y(θ) varies between an area less than a predetermined half angle of view θa and an area equal to or greater than the half angle of view θa as illustrated in FIG. 2B. Accordingly, when an increase in the image height y with respect to a unit half angle of view θ is defined as a resolution, the resolution varies depending on the areas.

This local resolution can also be expressed by a differential value dy(θ)/dθ of the projection characteristic y(θ) at the half angle of view θ. That is, as the slope of the projection characteristic y(θ) in FIG. 2B increases, the resolution increases. As internals between the image heights y at the half angle of view in the shape of contour lines in FIG. 2A increase, the resolution increases.

In the first embodiment, an area on a center side (a central part) formed on a sensor surface when the half angle of view θ is less than a predetermined half angle of view θa is referred to as a high-resolution area (a first area) 10a, and an area on a peripheral side (a peripheral part) in which the half angle of view θ is equal to or greater than the predetermined half angle of view θa is referred to as a low-resolution area (a second area) 10b. The high-resolution area 10a corresponds to imaging viewing angles 11a to 14a, and the low-resolution area 10b corresponds to imaging viewing angles 11b to 14b. That is, the light receiving surface includes a first area and a second area on a peripheral side of the first area, wherein an increase in an image height with respect to a unit half angle of view in the first area is larger than an increase in an image height with respect to a unit half angle of view in the second area.

In the first embodiment, a circle of a boundary between the high-resolution area 10a and the low-resolution area 10b is referred to as a resolution boundary, and a boundary image on a display screen corresponding to the resolution boundary is referred to as a display resolution boundary or simply as a boundary image. The boundary image (the display resolution boundary) displayed on the display screen may not be circular. The boundary image may be rectangular for the purpose of convenience. The boundary between the high-resolution area 10a and the low-resolution area 10b may not be circular but elliptical or distorted.

The gravity center of the boundary 93 (the high-resolution area 10a) may not match a position at which the optical axis of the optical system crosses the light receiving surface. In the first embodiment, since the gravity center of the boundary 93 (the high-resolution area 10a) substantially matches the position at which the optical axis of the optical system crosses the light receiving surface, it is possible to facilitate optical design, to obtain stable optical characteristics, and to reduce a load for distortion correction.

In the first embodiment, the high-resolution area 10a is a low-distortion area with relatively low distortion, and the low-resolution area 10b is a high-distortion area with relatively high distortion. Accordingly, in the first embodiment, the high-resolution area and the low-resolution area correspond to a low-distortion area and a high-distortion area, and the high-resolution area and the low-resolution area may be referred to as a low-distortion area and a high-distortion area. On the other hand, the low-distortion area and the high-distortion area may be referred to as a high-resolution area and a low-resolution area.

The optical system of the camera unit 11 according to the first embodiment is configured such that a projection characteristic y(θ) in the high-resolution area (low-distortion area) 10a is greater than f×θ (where f is a focal distance of the optical system of the camera unit 11). The projection characteristic y(θ) in the high-resolution area (low-distortion area) is set to be different from the projection characteristic in the low-resolution area (high-distortion area).

When θ max defines a maximum half angle of view of the optical system of the camera unit 11, a ratio θa/max of θa to θ max is preferably equal to or greater than a predetermined lower limit and for example, the predetermined lower limit preferably ranges from 0.15 to 0.16.

The ratio θa/max of θa to θ max is preferably equal to or less than a predetermined upper limit and for example, the predetermined upper limit preferably ranges from 0.25 to 0.35. For example, when θ max is 90°, the predetermined lower limit is 0.15, and the predetermined upper limit is 0.35, θa can be preferably determined to be in a range of 13.5° to 31.5°.

The optical system of the camera unit 11 is configured such that the projection characteristic y(θ) satisfies Expression 1.

$$1 < f \times \sin(\theta\,max)/y(\theta\,max) \leq 1.9 \quad \text{(Expression 1)}$$

Here, f denotes a focal distance of the optical system of the camera unit 11 as described above. By setting the lower limit to 1, a central resolution can be set to be higher than that of a fish-eye lens of an orthographic type ($y=f\times\sin\theta$) with the same maximum imaging height. By setting the upper limit to 1.9, it is possible to keep good optical performance while obtaining a viewing angle equivalent to that of a fish-eye lens. The upper limit can be determined in consideration of a resolution balance between the high-resolution area and the low-resolution area, and can be preferably determined in a range of 1.4 to 1.9.

By constructing the optical system in this way, a high resolution is acquired in the high-resolution area 10a, and it is possible to reduce an increase of the image height y with respect to the half angle of view θ per unit and to perform imaging at a wider viewing angle in the low-resolution area 10b. Accordingly, it is possible to acquire a high resolution in the high-resolution area 10a using a wide viewing angle equivalent to that of a fish-eye lens as an imaging area.

In the first embodiment, since the high-resolution area (low-distortion area) has characteristics close to a central projection type ($y=f\times\tan\theta$) or an equidistant projection type ($y=f\times\theta$) which are projection characteristics of a normal imaging optical system, it is possible to accurately display an image with low optical distortion. Accordingly, it is possible to obtain a natural perspective feeling at the time of seeing a nearby vehicle such as a preceding vehicle or a following vehicle and to achieve excellent visibility by curbing deterioration in image quality.

When the projection characteristic y(θ) satisfies the conditions of Expression 1, the same advantages can be obtained and thus the present disclosure is not limited to the projection characteristic illustrated in FIG. 2. In the first embodiment, the optical system having the projection characteristic y(θ) satisfying the conditions of Expression 1 may be referred to as a different-angle-of-view lens.

The high-resolution areas 10a of the optical systems of the camera units 11 to 14 correspond to imaging viewing angles 11a to 14a, and the low-resolution areas 10b correspond to imaging viewing angles 11b to 14b.

Figure 3:
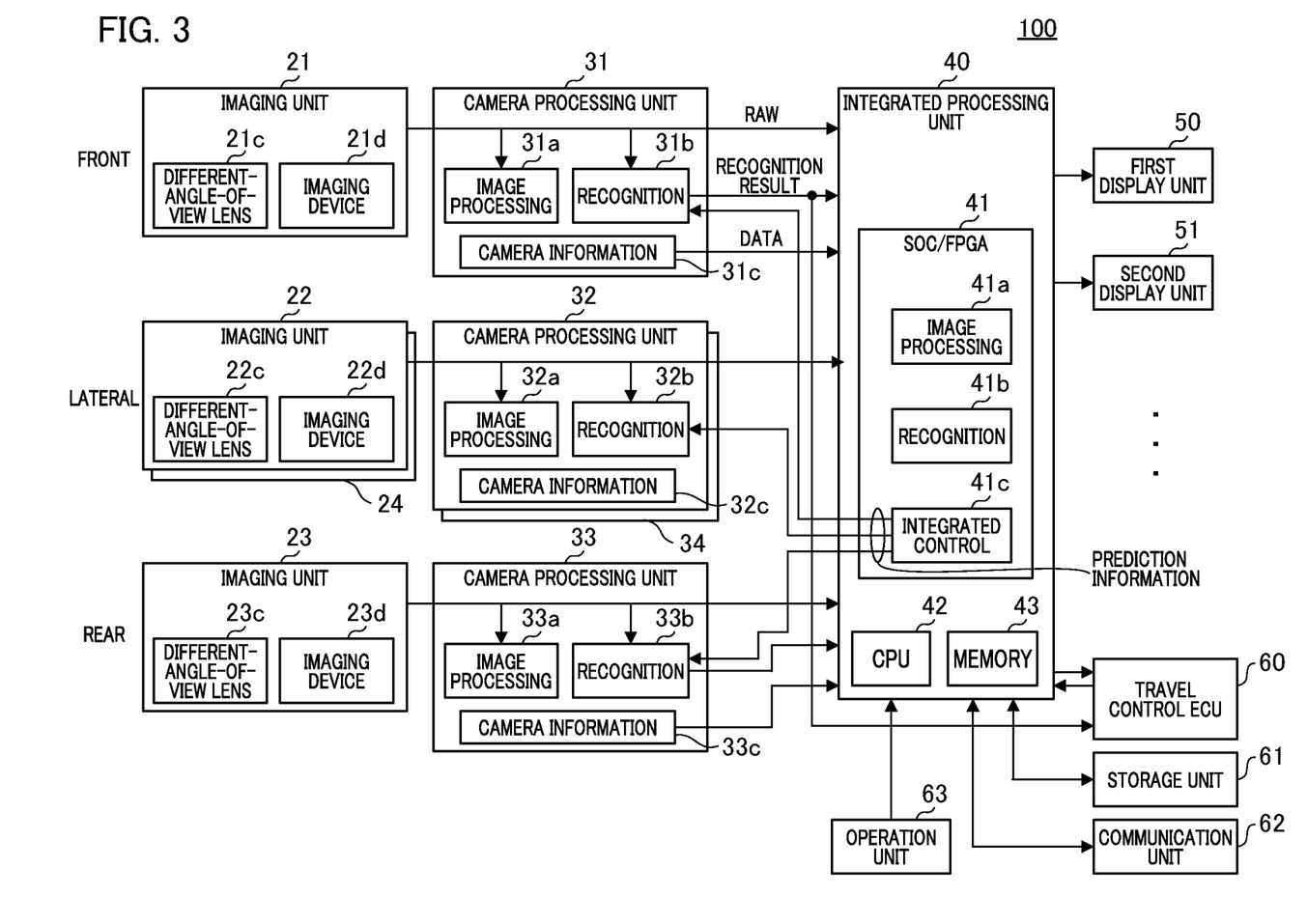
FIG. 3 is a functional block diagram illustrating a configuration of an image processing system according to the first embodiment.

A configuration of an image processing system according to the first embodiment will be described below with reference to FIG. 3. FIG. 3 is a functional block diagram illustrating the configuration of the image processing system according to the first embodiment.

The image processing system 100 illustrated in FIG. 3 is mounted in a vehicle 1 which is a mobile object (a moving device), and imaging units 21 to 24 and camera processing units 31 to 34 are provided in housings of the camera units 11 to 14.

The imaging units 21 to 24 include different-angle-of-view lenses 21c to 24c and imaging devices 21d to 24d such as CMOS image sensors or CCD image sensors.

The different-angle-of-view lenses 21c to 24c which are optical systems include one or more optical lenses, have a projection characteristic y(θ) satisfying the conditions of Expression 1, and form optical images having a low-distortion area and a high-distortion area on the light receiving surfaces of the imaging devices 21d to 24d. The imaging devices 21d to 24d serve as imaging devices and serve to convert an optical image in a photoelectric manner and to output an imaging signal. In the light receiving surfaces of the imaging devices 21d to 24d, for example, RGB color filters are disposed for each pixel. The arrangement of RGB is, for example, a Bayer layout.

Accordingly, from each imaging device, R, G, R, and G signals are sequentially output, for example, from a predetermined row of the Bayer layout. G, B, G, and B signals are sequentially output from a neighboring row.

Reference signs 31 to 34 denote camera processing units, which are accommodated in the same housings of the same camera units 11 to 14 along with the imaging units 21 to 24 and process imaging signals output from the imaging units 21 to 24. In FIG. 3, details and wiring lines of the imaging units 24 and the camera processing units 34 are omitted for the purpose of convenience.

The camera processing units 31 to 34 include image processing units 31a to 34a, recognition units 31b to 34b, and camera information units 31c to 34c. The image processing units 31a to 34a perform image processing on the imaging signals output from the imaging units 21 to 24. Some or all processes performed by the camera processing unit 31 may be performed by a stacked signal processing unit in the imaging devices 21d to 24d.

Specifically, the image processing units 31a to 34a perform de-Bayer processing on image data input according to the Bayer layout from the imaging units 21 to 24 and convert the image data to image data in an RGB raster format. The image processing units perform various correction processes such as white balance adjustment, gain offset adjustment, gamma processing, color matrix processing, and reversible compression. Here, so-called RAW image signals are formed without performing irreversible compression or the like.

The recognition units 31b to 34b recognize a predetermined object (for example, a vehicle, a person, or an obstacle) from the RAW image signals which have been processed by the image processing units 31a to 34a and of which distortion has not been corrected. That is, the recognition units 31b to 34b perform image recognition on image signals corresponding to the low-distortion area in a RAW image signal state without performing distortion correction thereon and output first image recognition results.

The recognition units 31b to 34b according to the first embodiment perform an image recognizing process on at least the RAW image signals acquired from the high-resolution areas 10a and recognizes a predetermined object. For this purpose, the image recognizing process may be performed after only the high-resolution area 10a has been cut out.

At this time, the recognition units 31b to 34b may also perform the image recognizing process on the RAW image signals acquired from the low-resolution areas 10b. Since these RAW image signals have not been subjected distortion correction, an image of the peripheral part of each different-angle-of-view lens has high distortion and low recognition reliability.

Alternatively, the recognition units 31b to 34b may cut out the RAW image signals acquired from the high-resolution areas 10a and perform the image recognizing process on only the RAW image signals acquired from the high-resolution areas 10a.

It is preferable that an area cut out for image recognition at that time be a rectangular shape which is appropriate for the image recognizing process. The cut-out rectangular area may be only a part of each high-resolution area 10a (for example, a rectangle inscribing the high-resolution area 10a) or may be a rectangular shape including both the high-resolution area 10a and the low-resolution area 10b.

Here, the recognition units 31b to 34b serve as a first image recognition device that recognizes an image on the basis of image signals of at least a partial area out of the image signals acquired by the imaging devices and outputs a first image recognition result. In the first embodiment, the partial area is an area corresponding to the low-distortion area.

The recognition units 31b to 34b transmit a set of an object type and coordinates thereof as a recognition result to an integrated processing unit 40.

On the other hand, the recognition units 31b to 34b receive prediction information which is a set of information on an object type and a moving direction of the corresponding object or preferential recognition area information from an integrated control unit 41c of the integrated processing unit 40. This prediction information will be described later.

Here, the output of the recognition unit 31b of the camera unit 11 installed for a front view may also be directly supplied to a travel control unit (ECU) 60. This is because travel may need to be controlled such that the vehicle stops immediately or avoids an obstacle on the basis of a recognition result of an obstacle from the recognition unit 31b.

The camera information units 31c to 34c store camera information of the camera units 11 to 14 in a memory in advance. The camera information units may temporarily store information from various sensors and the like provided in the camera units 11 to 14. The camera information includes, for example, the characteristic information (such as resolution boundary information) illustrated in FIG. 2 of optical images formed by the different-angle-of-view lenses 21c to 24c.

The camera information also includes the numbers of pixels of the imaging devices 21d to 24d, position coordinate and posture (such as pitch, roll, and yaw) information in a vehicle coordinate system of the camera units, and imaging directions. The camera information may include information such as gamma characteristics, sensitivity characteristics, and frame rates.

The camera information may include information on an image processing method or an image format when the RAW image signals are generated by the image processing units 31a to 34a.

The position coordinates for attachment may be stored in a memory in the corresponding camera information unit in advance because the attachment position of each camera unit on the vehicle is often determined. Posture coordinates of a camera unit are coordinates relative to the vehicle 1 and may be acquired using an encoder or the like (not illustrated) provided in the corresponding camera unit. Alternatively, the posture coordinates of each camera unit may be acquired using a three-dimensional acceleration sensor or the like.

The information on an imaging direction may be acquired, for example, using a geomagnetic sensor. The resolution boundary information of a camera is determined by lens design and thus is stored in the memory of the camera information unit in advance.

The camera information is information specific to the imaging units 21 to 24 and differs, and such information is transmitted to the integrated processing unit 40 and is referred to by the integrated processing unit 40 at the time of performing image processing or the like. Here, the camera information units 31c to 34c serve as a storage unit that stores characteristic information of the optical characteristics thereof or position and posture information of the corresponding camera unit.

A CPU which is a computer or a memory which is a storage medium storing a computer program is provided in the camera processing units 31 to 34. The CPU is configured to control constituents of the camera processing units 31 to 34 by executing the computer program in the memory.

In the first embodiment, the image processing units 31a to 34a or the recognition units 31b to 34b are configured by hardware such as a dedicated circuit (ASIC) or a processor (a reconfigurable process or a DSP). Accordingly, it is possible to realize an increase in image recognition speed in a high-resolution area and to enhance a possibility of avoidance of an accident. The image processing units 31a to 34a may have a distortion correcting function.

Some or all of the functional blocks in the camera processing units 31 to 34 may be realized by causing the CPU to execute a computer program stored in the memory. In this case, it is preferable to increase a processing speed of the CPU.

Reference sign 40 denotes an integrated processing unit and includes a system on chip (SOC)/field programmable gate array (FPGA) 41, a CPU 42 which is a computer, and a memory 43 which is a storage medium. The CPU 42 performs various types of control of the image processing system 100 as a whole by executing a computer program stored in the memory 43. In the first embodiment, the integrated processing unit 40 is accommodated in a housing different from that for the camera units.

The SOC/FPGA 41 includes an image processing unit 41a, a recognition unit 41b, and an integrated control unit 41c. The image processing unit 41a acquires RAW image signals from the corresponding camera processing units 31 to 34 and acquires camera information of the camera units 11 to 14 from the camera information units 31c to 34c.

As described above, the camera information includes optical characteristics of the different-angle-of-view lenses 21c to 24c, the numbers of pixels, photoelectric conversion characteristics, y characteristics, and sensitivity characteristics of the imaging devices 21d to 24d, format information of RAW image signals, or position coordinates and posture information in the vehicle coordinate system of the camera units.

The image processing unit 41a acquires camera information such as characteristic information of the optical system. The image processing unit 41a performs resolution conversion on the RAW image signals from the camera processing units 31 to 34 on the basis of the acquired camera information and performs an image processing step such as distortion correction on image signals acquired from the low-resolution area 10b of the imaging units 21 to 24.

That is, the image processing unit 41a performs distortion correction on an image signal from a distortion-correction area on the basis of the optical characteristics, and synthesizes the distortion-corrected image signal and an image signal from a non-distortion-correction area which has not been subjected to distortion correction to generate a composite image. That is, the image processing unit 41a also serves as a display signal generating unit and performs a display signal generating step of generating a composite image by performing distortion correction or the like. The distortion-correction area in the first embodiment can be set by a user or automatically.

In the first embodiment, since the image signal acquired from the high-resolution area 10a is hardly distorted, the image processing unit 41a does not perform distortion correction on the image signal acquired from the high-resolution area 10a. Here, the image processing unit 41a may also perform simplified distortion correction on the image signal acquired from the high-resolution area 10a. The image processing unit 41a appropriately an irreversible compression process or the like on the RAW image signals from the camera processing units 31 to 34.

The image processing unit 41a synthesizes the image signal from the low-resolution area 10b of each of the imaging units 21 to 24 having performed distortion correction and the image signal from the high-resolution area 10a such that the image signals join smoothly to form the whole image for each of the imaging units 21 to 24.

When distortion correction is performed on both the image signal acquired from the low-resolution area 10b and the image signal acquired from the high-resolution area 10a, the image processing unit 41a may perform distortion correction on the RAW image signals acquired by the image processing units 31a to 34a without any change.

The image processing unit 41a performs image processing such as rotation of an image particularly on the basis of the arrangement position and posture information of the cameras in the camera information. This will be described later.

The recognition unit 41b performs an image recognizing process on the whole image of each of the imaging units 21 to 24 in which distortion correction has been performed on at least the low-resolution area and recognizes a predetermined object (for example, a vehicle, a person, or an obstacle) in the whole image of each of the imaging units 21 to 24. That is, after distortion correction has been performed on an image signal corresponding to at least the low-resolution area (high-distortion area), the recognition unit 41b performs image recognition and outputs a second image recognition result.

At this time, the recognition unit 41b also refers to the recognition results (types or coordinates of an object) from the recognition units 31b to 34b. It is described above that the recognition unit 41b performs image recognition on the whole image of each of the imaging units 21 to 24, but image recognition does not have to be performed on the whole image. For example, a peripheral part of an image may not be subjected to image recognition.

That is, the recognition unit 41b has only to recognize, for example, an area including the areas recognized by the recognition units 31b to 34b and wider than the areas.

Here, the recognition unit 41b serves as a second image recognizing unit that performs image recognition on an image signal of an area including a partial area subjected to image recognition by the first image recognizing unit and wider than the partial area out of the image signals acquired by the image acquiring unit and outputs a second image recognition result. The second image recognizing unit performs image recognition on a composite image into which image signals corresponding to the high-resolution area 10a which is a low-distortion area and the low-resolution area 10b which is a high-distortion area are synthesized and outputs the second image recognition result.

In the first embodiment, the image processing unit 41a forms a panoramic composite image by synthesizing the images from the camera units 12 to 14 which are a plurality of imaging units such that the images join.

In this case, it is preferable that the images of the plurality of imaging units to join be set such that at least parts of the imaging viewing angles thereof overlap by a predetermined amount or greater.

The camera units 12 and 13 may be disposed such that the imaging areas thereof overlap each other as will be described later. The camera units 13 and 14 may be disposed such that the imaging areas thereof overlap each other. At this time, the imaging areas of the low-distortion areas of at least two image acquiring units may overlap each other.

The recognition unit 41b performs image recognition on the panoramic composite image. Accordingly, for example, it is possible to recognize an image of an object which is imaged to extend over the viewing angles of a plurality of imaging units. This is because the whole image of an object may not be recognized from the individual whole images from the imaging units, but substantially the whole image of the object may appear in the panoramic composite image and the image of the object may be able to be recognized through image processing.

For example, when the recognition result from the recognition units 31b to 34b and the recognition result from the recognition unit 41b are different, the integrated control unit 41c outputs an integrated image recognition result by employing the recognition result with higher reliability.

For example, a proportion occupied by an object in the image recognized by the recognition units 31b to 34b and a proportion occupied by the same object recognized by the recognition unit 41b in a screen may be compared, and the recognition result with the larger proportion may be determined to have higher reliability and be employed.

Alternatively, when an object extends over both high-resolution area and the low-resolution area, the recognition result from the recognition unit 41b may be determined to have higher reliability than the recognition result from the recognition units 31b to 34b and be employed. Alternatively, when an object recognized by the recognition units 31b to 34b is located in a peripheral part of the screen, this recognition result may be determined to have lower reliability, and the recognition result from the recognition unit 41b may be determined to have higher reliability and be employed.

Alternatively, the recognition unit 41b may perform image recognition on only the low-resolution area in a state in which distortion correction has been performed on the low-resolution area, and may perform image recognition on an object extending over the low-resolution area and the high-resolution area when there is such an object. That is, an object which is located in only the high-resolution area may be considered to have high reliability of recognition using the recognition units 31b to 34b and may not be subjected to an image recognizing process by the recognition unit 41b.

Here, the integrated control unit 41c serves as an integrated processing unit that outputs an integrated image recognition result on the basis of reliability of the first image recognition result and reliability of the second image recognition result.

The integrated control unit 41c forms a signal for displaying a desired image on a first display unit 50 and a second display unit 51 out of the whole images from the imaging units 21 to 24, the panoramic composite image, and the like. The integrated control unit 41c generates a frame for emphasizing a recognized object, information on a type, a size, a position, a speed, and the like of the object, a computer graphics (CG) for warning, and the like.

The integrated control unit 41*c* may generate a CG of a boundary image for displaying a boundary on the basis of characteristic information of the optical system such as display resolution boundary information acquired from the camera information units 31*c* to 34*c*.

The integrated control unit 41*c* performs a display process of superimposing such a CG or text on an image. The first display unit 50, the second display unit 51, and the like serve as a display unit and are configured to display an image signal or an integrated image recognition result.

In the first embodiment, the integrated control unit 41*c* is configured to allow a plurality of camera units to share information on a recognized object. That is, for example, it is assumed that an object recognized by the camera unit 14 is moving to the viewing angle of the camera unit 11. In this case, the integrated control unit 41*c* transmits prediction information including information on the type of the object and the moving direction of the object or preferential recognition area information to the recognition unit 31*b* of the camera unit 11.

By allowing the recognition units 31*b* to 34*b* of the camera units 11 to 14 to share such prediction information, it is possible to improve accuracy of image recognition in the recognition units 31*b* to 34*b* of the camera units 11 to 14. Sharing of such prediction information is effective particularly when the recognition units 31*b* to 34*b* of the camera units 11 to 14 are separate from the recognition unit 41*b* of the integrated processing unit 40.

The integrated control unit 41*c* performs communication with the travel control unit (ECU) 60 and the like via a communication unit (not illustrated) provided therein using a protocol such as CAN, FlexRay, or Ethernet. Accordingly, the integrated control unit 41*c* performs a display process of appropriately changing information to be displayed on the basis of a vehicle control signal received from the travel control unit (ECU) 60. That is, a range of an image to be displayed on the display unit or the like is changed, for example, according to a moving state of the vehicle acquired from the vehicle control signal.

The travel control unit (ECU) 60 is a unit that is mounted in the vehicle 1 and includes a computer or a memory for comprehensively performing drive control, direction control, and the like of the vehicle 1. As the vehicle control signal, for example, information on traveling (a moving state) of the vehicle such as a traveling speed, a traveling direction, a shift lever, a shift gear, a blinker's state, and a direction of the vehicle from a geomagnetic sensor or the like are input from the travel control unit (ECU) 60 to the integrated processing unit 40.

On the other hand, the integrated control unit 41*c* transmits information such as a type, a position, a moving direction, and a moving speed of a predetermined object (such as an obstacle) recognized by the recognition unit 41*b* to the travel control unit (ECU) 60. In response thereto, the travel control unit (ECU) 60 performs control required for avoidance of an obstacle such as stopping and driving of the vehicle and changing of the traveling direction. Here, the travel control unit (ECU) 60 serves as a movement control unit that controls movement of a vehicle which is a mobile object (a moving device) on the basis of the integrated image recognition result.

For example, the first display unit 50 may be installed in the vicinity of the center in a vehicle width direction of a front-upper part of a driver's seat of the vehicle 1 such that a display screen thereof faces the rear of the vehicle, and serves as an electronic rearview mirror. By using a half mirror or the like, the first display unit 50 may be used as a mirror when it is not used as a display. The first display unit 50 may be configured to include a touch panel or an operation button, to acquire an instruction from a user, and to output information to the integrated control unit 41*c*.

The second display unit 51 is installed, for example, near an instrument panel in the vicinity of the center in the vehicle width direction of the front part of the driver's seat of the vehicle 1. A navigation system, an audio system, and the like (not illustrated) are mounted in the vehicle 1 which is a mobile object (a moving device).

For example, various control signals from the navigation system, the audio system, and the travel control unit (ECU) 60 can also be displayed on the second display unit. The second display unit is configured to include a touch panel or an operation button and to acquire an instruction from a user.

The second display unit 51 may be, for example, a display unit of a tablet terminal. In this case, the second display unit 51 may be configured to display an image through wired connection to the integrated processing unit 40 or may be configured to wirelessly receive an image via a communication unit 62 and to display the received image.

A liquid crystal display panel, an organic EL display panel, or the like can be used as a display panel of the first display unit 50 or the second display unit 51. The number of display units is not limited to three.

Some or all of the functional blocks included in the integrated processing unit 40 and the like may be realized in hardware or may be realized by causing the CPU 42 to execute a computer program stored in the memory 43. A dedicated circuit (ASIC), a processor (a reconfigurable process or a DSP), or the like can be used as the hardware.

Some or all image processes which are performed by the image processing units 31*a* to 34*a* may be performed by the image processing unit 41*a* of the integrated processing unit 40. That is, in the first embodiment, for example, the image acquiring unit and the first image recognizing unit are accommodated in the same housing of the camera unit, and the camera unit and the second image recognizing unit are accommodated in different housings. However, for example, the first image recognizing unit along with the second image recognizing unit may be accommodated in the housing of the integrated processing unit 40.

In the first embodiment, the integrated processing unit 40 is mounted in a vehicle 1 which is a mobile object, but some processes of the image processing unit 41*a*, the recognition unit 41*b*, and the integrated control unit 41*c* of the integrated processing unit 40 may be performed, for example, by an external server or the like via a network.

In this case, for example, the imaging units 21 to 24 which are the image acquiring unit are mounted in the vehicle 1 which is a mobile object, but, for example, some functions of the camera processing units 31 to 34 or the integrated processing unit 40 may be performed by an external server or the like. Some or all functions of the integrated processing unit 40 may be provided in the travel control unit (ECU) 60.

Reference sign 61 denotes a storage unit, which stores whole images of the imaging units 21 to 24 generated by the integrated processing unit 40 or a panoramic composite image. A CG such as a predetermined frame indicating a recognized object, text, or warning, or an image overlapped with the CG and displayed on the first display unit 50 and the second display unit 51, and the like is stored along with time or GPS information.

The integrated processing unit 40 can also regenerate past information stored in the storage unit 61 and display the information on the first display unit 50 or the second display unit 51.

Reference sign 62 denotes a communication unit, which communicates with an external server or the like via a network and which can transmit information not stored yet in the storage unit 61 or past information stored in the past in the storage unit 61 to the external server or the like to store the information in the external server or the like. As described above, an image may be transmitted to an external tablet terminal or the like and the image may be displayed on the second display unit 51 which is a display unit of the table terminal.

The communication unit 62 can acquire congestion information or various types of information from an external server or the like and display the acquired information on the first display unit 50 or the second display unit 51 via the integrated processing unit 40. Reference sign 63 denotes an operation unit, which is used to input various instructions to the image processing system in response to a user's operation. The operation unit includes, for example, a touch panel or an operation button.

FIGS. 4A to 4D are diagrams illustrating a relationship between a light receiving surface of an imaging device of a camera unit and a high-resolution area and a low-resolution area according to the first embodiment.

Figure 4A:
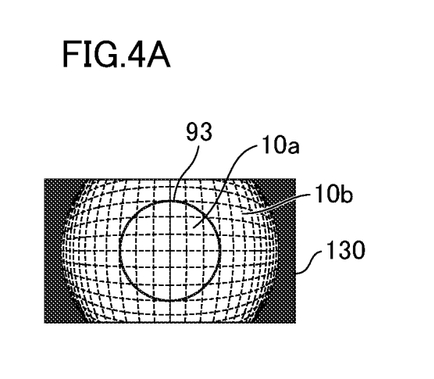
FIG. 4A is a diagram illustrating an example of a relationship between an optical system of a rear camera unit and a light receiving surface of an imaging device thereof according to the first embodiment.
Figure 4B:
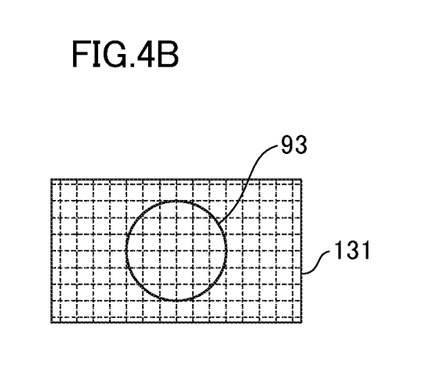
FIG. 4B is a diagram illustrating an example of a distortion-corrected image of the rear camera unit according to the first embodiment.

FIG. 4A is a diagram illustrating an example of a relationship the optical system of the rear camera unit 13 and the light receiving surface 130 of the imaging device according to the first embodiment, and FIG. 4B is a diagram illustrating an example of a distortion-corrected image of the rear camera unit 13 according to the first embodiment.

Figure 4C:
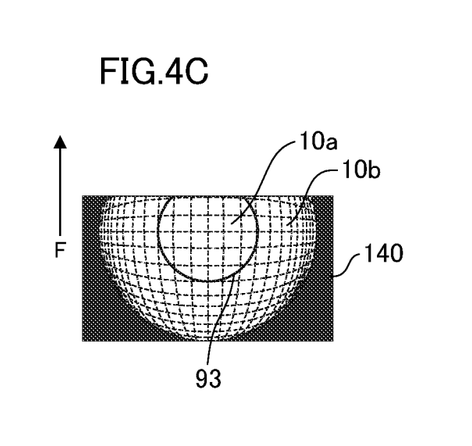
FIG. 4C is a diagram illustrating an example of a relationship between an optical system of a left camera unit and a light receiving surface of an imaging device thereof according to the first embodiment.
Figure 4D:
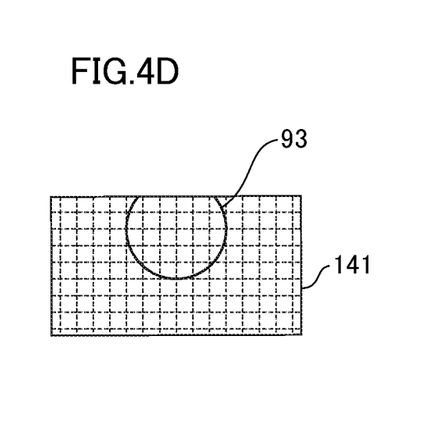
FIG. 4D is a diagram illustrating an example of a distortion-corrected image of the left camera unit according to the first embodiment.

FIG. 4C is a diagram illustrating an example of a relationship the optical system of the left camera unit 14 and the light receiving surface 140 of the imaging device according to the first embodiment, and FIG. 4D is a diagram illustrating an example of a distortion-corrected image of the left camera unit 14 according to the first embodiment.

In FIG. 4A, for example, an image illustrated in FIG. 2A is formed on the light receiving surface 130 of the imaging device of the rear camera unit 13. The substantial center of the light receiving surface 130 of the imaging device and the center of the high-resolution area 10a (the optical axis of the optical system) are disposed to substantially match.

Reference sign 93 denotes a boundary between the high-resolution area 10a and the low-resolution area 10b, and the center of the boundary 93 substantially matches, for example, the substantial center of the light receiving surface 130 of the imaging device of the rear camera unit 13. In the first embodiment, the center of the boundary 93 (the high-resolution area 10a) matches a position at which the optical axis of the optical system crosses the light receiving surface, but may not match the position.

Accordingly, in an image 131 obtained by performing distortion correction on an image signal from the rear camera unit 13 illustrated in FIG. 4B, the center of boundary 93 is disposed substantially at the center of the screen. When distortion correction is performed on the image of the low-resolution area (high-distortion area) 10b, the distortion correction may be performed on the image of the high-resolution area 10a, but the distortion correction may not be performed on the image of the high-resolution area 10a. In this case, when the image of the high-resolution area 10a having distortion correction not performed thereon and the image of the low-resolution area (high-distortion area) 10b having distortion correction performed thereon are synthesized, a process for causing boundary parts to join smoothly is necessary.

Distortion correction in the first embodiment is a correction process for reducing distortion and includes a process in which distortion is not zero. For example, distortion may be left in a part such as a peripheral part.

An area having distortion correction not performed thereon is not limited to a circular high-resolution area (low-distortion area) 10a as illustrated in FIG. 4B. The area may have another shape such as a rectangular shape or a size or a position thereof may be changed.

In this way, for example, an image of an imaging viewing angle 13a of the rear camera unit 13 is formed in the high-resolution area (low-distortion area) 10a of the light receiving surface 130 as illustrated in FIG. 4A. An image of an imaging viewing angle 13b is formed in the low-resolution area (high-distortion area) 10b of the light receiving surface 130. The same relationship as illustrated in FIGS. 4A and 4B is established for the front camera unit 11.

On the other hand, in the first embodiment, the center of the high-resolution area (low-distortion area) 10a of the left camera unit 14 is deviated from the center of the light receiving surface 140 of the imaging device to an upper side in the drawing (in a first direction) as illustrated in FIG. 4C. That is, in the left camera unit 14, the optical system and the imaging device are disposed such that the center of the boundary 93 is deviated from the center of the light receiving surface 140 of the imaging device to the upper side in the drawing (in the first direction).

Here, the first direction is also referred to as a vignetting direction F. Accordingly, it is possible to control a range of the low-resolution area 10b which is formed on the imaging device. In FIG. 4C, the imaging area of the low-resolution area 10b can be extended to a direction opposite to the vignetting direction F.

In the first embodiment, a plurality of pixels are arranged in rows and columns on the light receiving surface 140 of the imaging device, and photoconverting and reading is performed row by row in a predetermined second direction (a vertical scanning direction) sequentially from the pixels in a predetermined row. The light receiving surface is rectangular, and the number of pixels in the length direction is larger than the number of pixels in the width direction.

Charge signals photoconverted by the pixels of the light receiving surface of the imaging device are sequentially read row by row from an upper-left end to a lower-right end for each row when the length direction of the rectangle is defined as a lateral direction. In the first embodiment, the first direction is opposite to the second direction.

Accordingly, in the distortion-corrected image 141, the center of the boundary 93 is deviated to the upper side of the screen as illustrated in FIG. 4D. Therefore, a part of the viewing angle in the upward direction (the vignetting direction F) in FIGS. 4C and 4D is lost, and the viewing angle in the downward direction can be widened in comparison with the example illustrated in FIG. 4A. As a result, it is possible to effectively use the pixels on the light receiving surface of the imaging device. The same relationship as illustrated in FIGS. 4C and 4D is established for the right camera unit 12.

In the first embodiment, the first direction is set to a direction opposite to the second direction, but the first direction and the second direction may be the same direction. In this case, a process for changing the direction of an image is necessary. The first direction may be set to a direction perpendicular to the second direction. In this case, a maximum number of pixels may not be effectively used.

Alternatively, the first direction and the second direction may be set to have an appropriate angle.

Figure 5A:
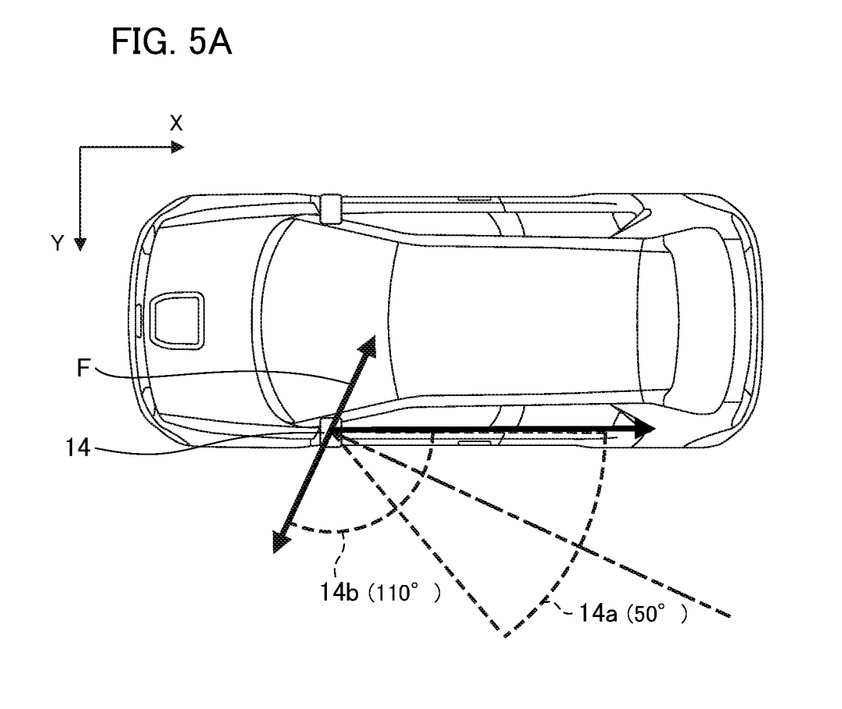
FIG. 5A is a diagram illustrating a top view of a vehicle according to the first embodiment and FIG. 5B is a diagram illustrating a left side view of the vehicle according to the first embodiment.
Figure 5B:
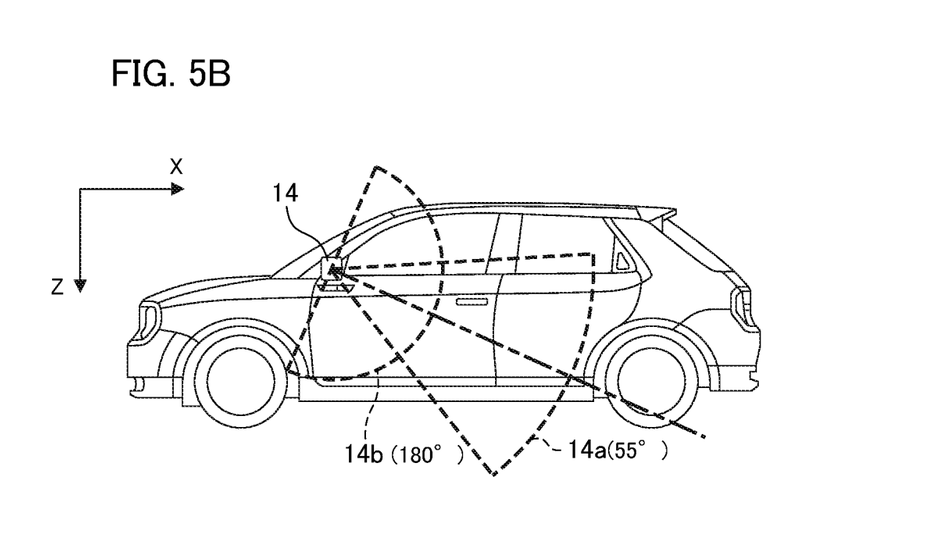

FIGS. 5A to 7B are diagrams illustrating an arrangement example of the left camera unit 14, where FIGS. 5A and 5B are diagrams illustrating an example of the first embodiment in which the imaging device of the camera unit 14 is vertically arranged and the optical axis of the optical system is directed slightly downward with respect to the horizontal direction on the rear-left side of the vehicle 1. FIG. 5A is a diagram illustrating a top view of the vehicle 1 according to the first embodiment, and FIG. 5B is a diagram illustrating a left side view of the vehicle 1 according to the first embodiment.

In the example illustrated in FIGS. 5A and 5B, the upward direction (the vignetting direction F) of the imaging device in FIG. 4C is disposed to face the vehicle 1 as illustrated in FIG. 5A. That is, the first direction (the vignetting direction F) is a direction perpendicular to the vertical direction and is disposed to face the mobile object.

By employing this arrangement, a vehicle body which is an untargeted area may not be imaged on the imaging device and the imaging viewing angle 14b corresponding to the low-resolution area 10b which can be imaged is extended to the front-left side. Accordingly, it is possible to facilitate recognition of an obstacle or the like on the front-left side.

In the arrangement illustrated in FIGS. 5A and 5B, the number of pixels in the height direction (the Z direction) is larger than the number of pixels in the width direction (the Y direction) of the vehicle 1, and the optical axis of the optical system is directed outward with respect to a side line of the vehicle 1 in the length direction (the X direction) of the vehicle 1. In FIGS. 5A to 7B, the optical axis is indicated by a one-dot chain line. In the height direction (the Z direction) of the vehicle, the optical axis of the optical system is disposed in the horizontal direction or downward with respect to the horizontal direction.

With this arrangement, since a vignetting viewing angle is extended to the vehicle body side and a part of the vehicle 1 is displayed on the screen, a sense of distance relative to other objects can be easily felt and a display viewing angle on the front-lateral side can be extended, whereby the light receiving surface of the imaging device can be effectively used.

Since the high-resolution area 10a can be more used as display for the electronic rearview mirror, a driver can accurately confirm the rear-lateral side and a blind spot on the front-lateral side in the low-resolution area 10b can be imaged with the low-resolution area 10b.

That is, when the arrangement illustrated in FIGS. 5A and 5B is employed, the viewing angle of the low-resolution area 10b in the height direction of the vehicle 1 can include a front wheel and thus it is possible to sufficiently visually recognize a blind spot on the front-lateral side, which is very effective when the vehicle parks in a narrow space or the like.

In FIGS. 5A and 5B, the left camera unit 14 is illustrated, but the right camera unit 12 can be disposed to be symmetric. In this case, the same advantages can be achieved.

When the arrangement illustrated in FIGS. 5A and 5B is employed, the image processing unit 41a of the integrated processing unit 40 rotates and displays an image from the camera unit 14 on the basis of position and posture information of a camera in the camera information. The image from the camera unit 14 is synthesized with an image from the rear camera unit 13 and the composite image is displayed according to necessity.

On the other hand, when the camera unit 12 is attached to be symmetric with the arrangement illustrated in FIGS. 5A and 5B, the image processing unit 41a rotates and displays an image from the camera unit 12 on the basis of position and posture information of a camera in the camera information. The image from the camera unit 12 is synthesized with an image from the rear camera unit 13 and the composite image is displayed according to necessity. The image processing unit 41a displays the images from the camera units 11 and 13 without rotating the images on the basis of the position and posture information of the camera. Alternatively, the image is synthesized with another image.

In this way, in the first embodiment, the camera unit includes an imaging device and an optical system configured to form an optical image on a light receiving surface of the imaging device, and the light receiving surface includes a high-resolution area and a low-resolution area in a peripheral part of the high-resolution area. The optical system and the imaging device are disposed such that the gravity center of the high-resolution area deviates in a first direction from the center of the light receiving surface, and the camera unit is installed such that the first direction is directed to an area other than a predetermined targeted area.

Accordingly, since an untargeted area may not be formed on the imaging device and the imaging viewing angle 14b corresponding to the low-resolution area 10b which can be imaged is extended to the targeted area, it is possible to easily recognize an obstacle or the like in the targeted area.

Second Embodiment

Figure 6A:
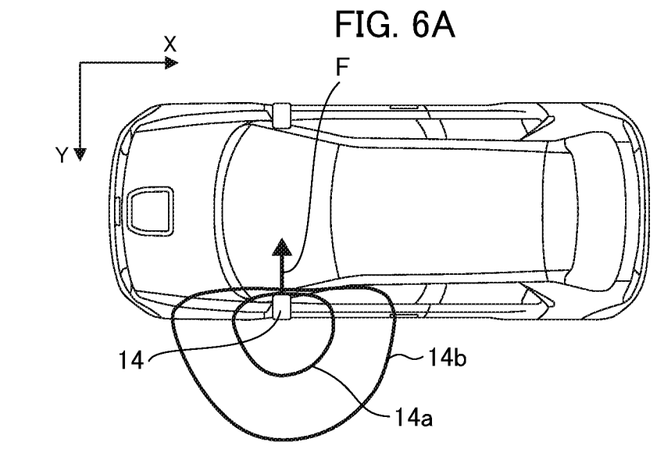
FIG. 6A is a diagram illustrating a top view of a vehicle according to a second embodiment.
Figure 6B:
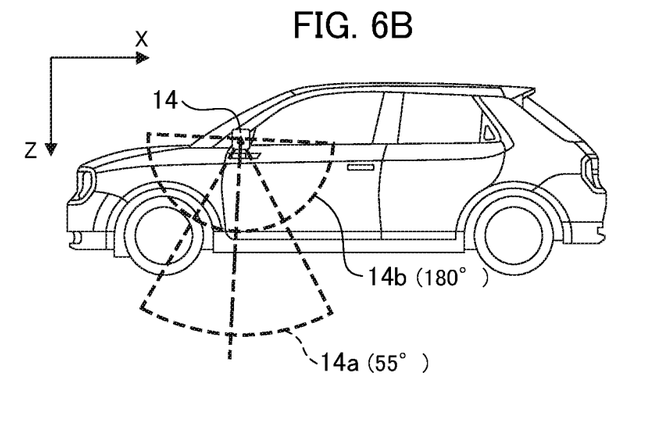
FIG. 6B is a diagram illustrating a left side view of the vehicle according to the second embodiment.
Figure 6C:
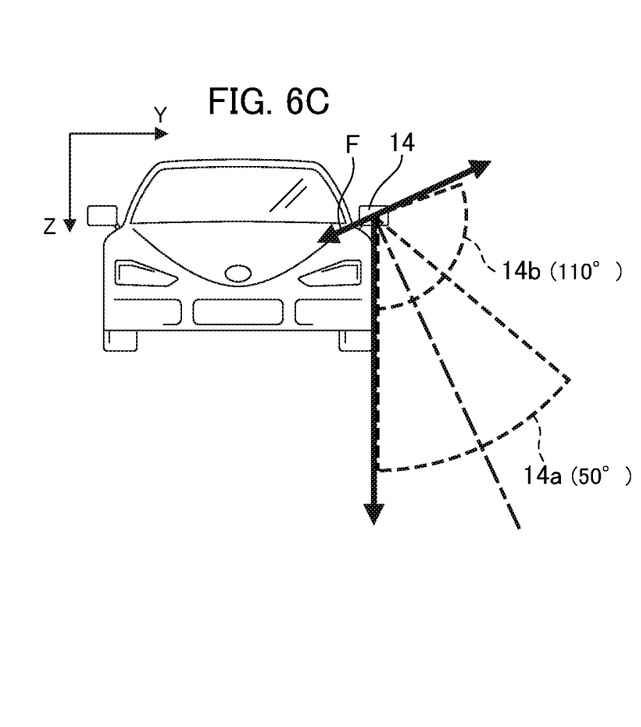
FIG. 6C is a diagram illustrating a front view of the vehicle according to the second embodiment.

FIGS. 6A to 6C are diagrams illustrating an example of a second embodiment in which the imaging device of the camera unit 14 is vertically disposed and the optical axis of the optical system is disposed just downward on the rear-left side of a vehicle 1. FIG. 6A is a diagram illustrating a top view of the vehicle 1 according to the second embodiment, FIG. 6B is a diagram illustrating a left side view of the vehicle 1 according to the second embodiment, and FIG. 6C is a diagram illustrating a front view of the vehicle 1 according to the second embodiment.

In the example illustrated in FIGS. 6A to 6C, the upward direction (the vignetting direction F) of the imaging device in FIG. 4C is directed to face the vehicle 1 as illustrated in FIGS. 6A and 6C.

In the arrangement illustrated in FIGS. 6A to 6C, the number of pixels in the length direction (the X direction) of the vehicle 1 is larger than the number of pixels in the width direction (the Y direction) of the vehicle 1, and the optical axis of the optical system is directed outward with respect to the downward vertical direction in the width direction (the Y direction) of the vehicle 1 as illustrated in FIG. 6C. In the height direction (the Z direction) of the vehicle, the optical axis of the optical system is disposed substantially downward along the vertical direction. As illustrated in FIG. 6C, the optical axis is inclined outward from the vertical direction on one side of the vehicle 1.

In this way, by directing the vignetting direction to the imaging viewing angle 14a corresponding to the high-resolution area 10a on the lateral side of the vehicle 1, the imaging viewing angle 14a corresponding to the high-resolution area 10a is slightly narrowed to, for example, 50 degrees as in the front view illustrated in FIG. 6C. However, since the imaging viewing angle 14b corresponding to the low-resolution area 10b includes a front-lower side of the vehicle 1 to the rear-lower side as illustrated in FIG. 6B, an obstacle or the like on the lower side can be more easily recognized than in the example illustrated in FIGS. 5A and 5B.

Since the imaging viewing angle 14a corresponding to the high-resolution area 10a is assigned to a blind spot on the front-lateral side, it is possible to confirm the blind spot on the front-lateral side with a high resolution.

In the width direction (the Y direction) of the vehicle 1, since a part of the vehicle body is included in the imaging viewing angle 14a corresponding to the high-resolution area 10a, a sense of distance to an obstacle or the like can be easily felt. The light receiving surface of the imaging device can be effectively used to obtain a down-around-view image around the vehicle 1, and it is possible to greatly reduce a blind spot particularly in case of a large truck or the like.

The left camera unit 14 has been described above with reference to FIGS. 6A to 6C, but the right camera unit 12 can also be arranged to be symmetric therewith. In this case, the same advantages can be achieved.

When the arrangement illustrated in FIGS. 6A to 6C is employed, the image processing unit 41a of the integrated processing unit 40 rotates an image from the camera unit 14 particularly on the basis of position and posture information of the camera in the camera information. The image from the camera unit 14 is synthesized with an image from the rear camera unit 13 and the composite image is displayed according to necessity.

On the other hand, when the right camera unit 12 is attached to be symmetric with the arrangement illustrated in FIGS. 6A to 6C, the image processing unit 41a rotates and displays an image from the camera unit 12 on the basis of position and posture information of the camera in the camera information. The image from the camera unit 12 is synthesized with an image from the rear camera unit 13 and the composite image is displayed according to necessity.

Third Embodiment

Figure 7A:
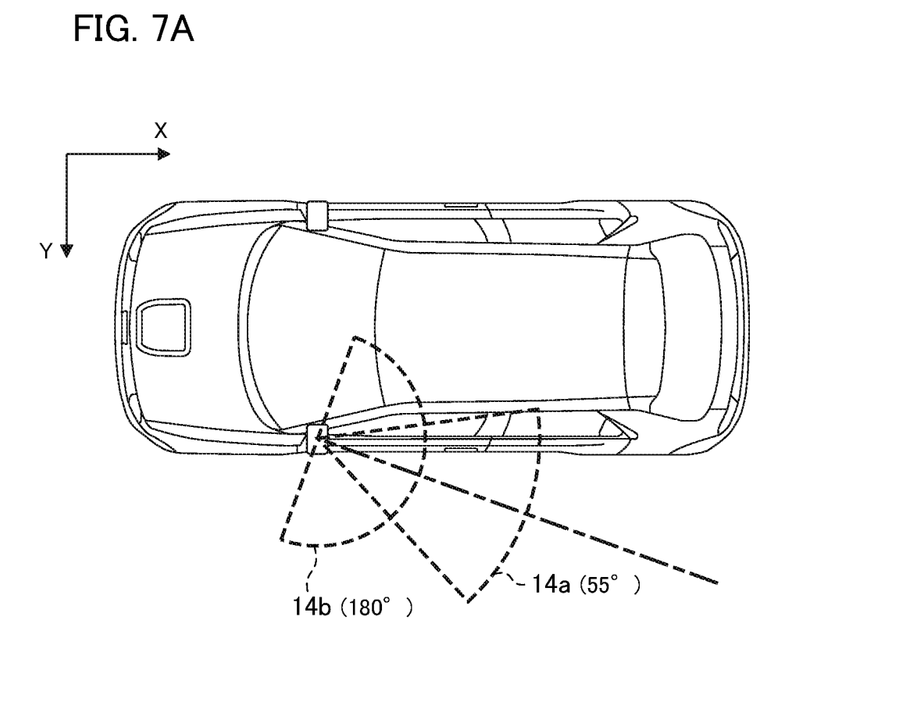
FIG. 7A is a diagram illustrating a top view of a vehicle according to a third embodiment and FIG. 7B is a diagram illustrating a left side view of the vehicle according to the third embodiment.
Figure 7B:
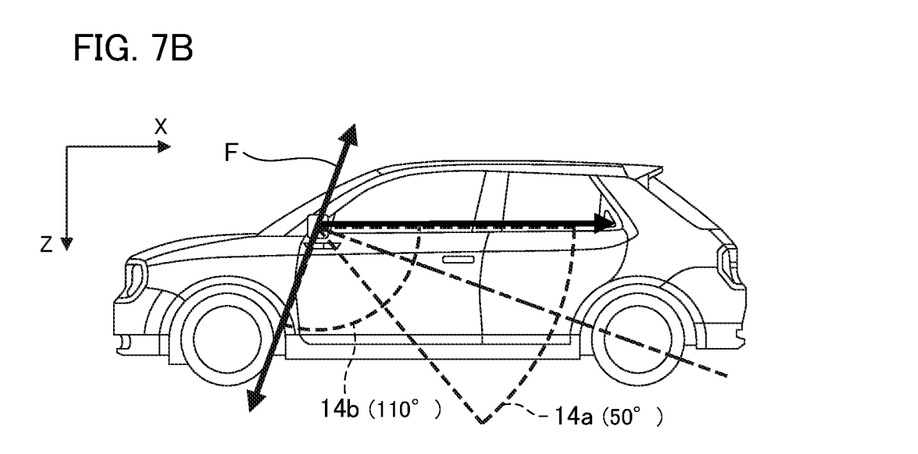

FIGS. 7A and 7B are diagrams illustrating an example of a third embodiment in which the imaging device of the camera unit 14 is horizontally disposed and the optical axis of the optical system is disposed slightly downward with respect to the horizontal direction on the rear-left side of a vehicle 1. FIG. 7A is a diagram illustrating a top view of the vehicle 1 according to the third embodiment, and FIG. 7B is a diagram illustrating a left side view of the vehicle 1 according to the third embodiment.

In the example illustrated in FIGS. 7A and 7B, the upward direction (the vignetting direction F) of the imaging device in FIG. 4C is directed to face a sky area as illustrated in FIG. 7B. That is, the vignetting direction F is directed upward with respect to the horizontal plane. At this time, a second direction (a sequential row reading direction) of the imaging device is directed downward with respect to the horizontal plane. That is, the first direction is not parallel to a horizontal scanning direction.

By employing this arrangement, the vignetting direction can be set to a direction to the sky area which is an untargeted area. As illustrated in FIG. 7B, since the imaging viewing angle 14a corresponding to the high-resolution area 10a is slightly narrowed to, for example, 50 degrees and the imaging viewing angle 14b corresponding to the left low-resolution area 10b is widened to the front-left side, it is possible to recognize an obstacle or the like on the front-left side.

In the arrangement illustrated in FIGS. 7A and 7B, the number of pixels in the width direction (the Y direction) is larger than the number of pixels in the height direction (the Z direction) of the vehicle 1, and the optical axis of the optical system is disposed outward with respect to the side line of the vehicle 1 in the length direction (the X direction) of the vehicle 1. In the height direction (the Z direction) of the vehicle 1, the optical axis of the optical system is disposed horizontally or downward with respect to the horizontal plane.

By employing this arrangement, the vignetting viewing angle is directed to the sky side in which there are little obstacles and thus it is possible to effectively use the light receiving surface of the imaging device.

Since the high-resolution area 10a can be more used as display for the electronic rearview mirror, a driver can accurately confirm the rear side and a blind spot on the front-lateral side in the low-resolution area 10b can be imaged with the imaging viewing angle 14b corresponding to the low-resolution area 10b.

In the length direction (the X direction) of the vehicle 1, since the imaging viewing angle 14a corresponding to the high-resolution area 10a includes a part of the vehicle 1, it is possible to easily feel a sense of distance to an obstacle or the like. In the height direction (the Z direction) of the vehicle 1, since a front wheel can be included in the imaging viewing angle 14b corresponding to the low-resolution area 10b, it is possible to sufficiently visually recognize a blind spot on the front-lateral side, which is very effective when the vehicle parks in a narrow space or the like.

In FIGS. 7A and 7B, the left camera unit 14 is illustrated, but the right camera unit 12 can be disposed to be symmetric therewith. In this case, the same advantages can be achieved.

When the arrangement illustrated in FIGS. 7A and 7B is employed, the image processing unit 41a of the integrated processing unit 40 displays an image without rotating the image when the camera unit 14 is disposed as illustrated in FIGS. 6A to 6C particularly on the basis of position and posture information of the camera in the camera information. The image from the camera unit 14 is synthesized with an image from the rear camera unit 13 and the composite image is displayed according to necessity.

When the right camera unit 12 is attached to be symmetric with the arrangement illustrated in FIGS. 6A to 6C, the image processing unit 41a displays an image from the camera unit 12 without rotating the image on the basis of position and posture information of the camera in the camera information. The image from the camera unit 12 is synthesized with an image from the rear camera unit 13 and the composite image is displayed according to necessity.

As described above, according to the first to third embodiments, the center of the high-resolution area 10a of the optical system including the high-resolution area 10a and the low-resolution area (high-distortion area) 10b is intentionally deviated from the center of the light receiving surface of the imaging device. Accordingly, a part of the viewing angle is lost out and the other side of the viewing angle is extended.

That is, since the vignetting direction (the first direction) is directed to an area other than a targeted area, it is possible to optimize the imaging viewing angle and to most effectively use the pixels of the imaging device.

An amount of deviation between the center of the high-resolution area 10a and the center of the light receiving surface of the imaging device, or the like can be changed according to applications or positions. For example, in case of the front camera unit 11 or the rear camera unit 13, the arrangement illustrated in FIGS. 4A and 4B can be achieved by reducing the amount of deviation or making it zero. On the other hand, in case of the right camera unit 12 or the left camera unit 14, the amount of deviation can be simply increased as illustrated in FIGS. 4C and 4D.

For example, it is possible to cope with cases of a large vehicle and a small vehicle by only appropriately changing the amount of deviation. It may also be possible to cope with cases in which a mobile object in which a camera unit is installed is a vehicle and a drone by only changing setting of the amount of deviation, which is more flexible in comparison with a case in which design of the optical system is changed according to applications or the like.

Here, the targeted area includes an area in which an obstacle is assumed to be present such as an area on an obliquely rear-lateral side of the vehicle 1 or an outer peripheral area of a wheel, for example, when a camera unit is installed on a lateral side of the vehicle 1. On the other hand, the vignetting direction (the first direction) is directed to the vehicle 1 (or the installation position) or the sky area other than the targeted area. Here, the targeted area changes according to applications in which the camera unit is installed.

As described above, according to the first to third embodiments, the high-resolution area (low-distortion area) 10a is configured to have projection characteristics approximating the central projection type ($y=f \times \tan \theta$) or the equidistant projection type ($y=f \times \theta$) of a normal imaging optical system.

Accordingly, for example, the solution of an image of the high-resolution area (low-distortion area) 10a displayed on the first display unit 50 or the second display unit 51 is higher than that of the low-resolution area (low-distortion area) 10b, and thus it is possible to more accurately display far images of the front view, the side view, and the rear view of the vehicle 1. As a result, the present disclosure is more advantageous in terms of costs, processing efficiency, decrease in size, and the like in comparison with a case in which a plurality of camera units with different viewing angles are used.

Since the high-resolution area 10a has small optical distortion, an image for the electronic rearview mirror displayed on the first display unit 50 can be displayed in a low-distortion state and thus a driver can visually recognize the surroundings of the vehicle with a more natural perspective feeling.

Since the high-resolution area 10a according to the aforementioned embodiments is configured to have low optical distortion and image recognition can be performed thereon in a state of a RAW image signal of which distortion has not been corrected, it is possible to reduce a processing load for image recognition and to perform image recognition at a high speed.

Accordingly, it is possible to detect an obstacle earlier on the basis of results of image recognition and to timely perform an operation for avoiding the obstacle. When the configuration according to the third embodiment is employed in this way, it is particularly advantageous for traveling at a high speed on an express way or the like.

An example in which whether to perform distortion correction or not is determined has been described above in the aforementioned embodiments, and the case in which distortion correction is not performed includes a case in which a distortion correction factor is less than a predetermined value X1. The case in which distortion correction is performed may include a case in which the distortion correction factor is greater than a predetermined value X2 (where X2 is equal to or greater than X1), where X1 may be set to, for example, 10% and X2 may be set to, for example, 90%.

The present disclosure is not limited to two types of distortion correction factors, but may employ a configuration in which the distortion correction factor changes gradually. The present disclosure includes such embodiments.

An example in which a plurality of camera units are used has been described above in the embodiments, but the present disclosure is effective in a system including only one camera unit.

A boundary image indicating a boundary between an area in which distortion correction is performed and an area in which distortion correction is not performed may be able to be displayed, for example, while the vehicle is normally traveling.

Particularly, when a difference in image at the boundary depending on whether distortion correction is performed or a luminance difference due to a difference in exposure timing between a distortion-corrected area and a non-distortion-corrected area is conspicuous, the aforementioned boundary may be displayed to reduce a feeling of discomfort.

In this case, a width, a concentration, a color, or the like of a line of the boundary image may be changed to reduce a feeling of discomfort between the distortion-corrected area and the non-distortion-corrected area. The distortion correction factor in the distortion-corrected area may be adjusted depending on the size and shape of the boundary image, and the images of the distortion-corrected area and the non-distortion-corrected area for a stationary object may be smoothly joined.

In addition to the time of normal traveling, when a user sets an area in which distortion correction is not performed in advance as described above or in a process of adjusting a posture of each camera unit, the boundary image may be displayed. Accordingly, the boundary between the distortion-corrected area and the non-distortion-corrected area becomes clear and thus it is possible to efficiently perform the adjustment operation.

An example in which the image processing system is mounted in a mobile object such as a vehicle has been described above in the embodiments. However, the mobile object according to the embodiments is not limited to a vehicle such as an automobile, but may be any of a train, a ship, an aircraft, a robot, and a drone as long as it is a movable object.

The image processing system according to the embodiments may or may not be mounted in such a mobile object. For example, the configurations according to the embodiments can also be applied to a case in which a mobile object is remotely controlled.

Fourth Embodiment

At least one of various functions, processes, and methods described above in the first to third embodiments may be realized using a program. In a fourth embodiment, a program for realizing at least one of various functions, processes, and methods described above in the first embodiment is referred to as a "program X."

In the fourth embodiment, a computer that executes the program X is referred to as a "computer Y" Examples of the computer Y include a personal computer, a microcomputer, and a central processing unit (CPU). The computer of the image processing system or the like according to the aforementioned embodiments is also an example of the computer Y.

At least one of various functions, processes, and methods described above in the first to third embodiments can be realized by causing the computer Y to execute the program X. In this case, the program X is supplied to the computer Y via a computer-readable storage medium.

The computer-readable storage medium according to the fourth embodiment includes at least one of a hard disk device, a magnetic storage device, an optical storage device, a magneto-optical storage device, a memory card, a ROM, and a RAM. The computer-readable storage medium according to the fourth embodiment is a non-transitory storage medium.

While the present disclosure has been described with reference to exemplary embodiments, it is to be understood that the disclosure is not limited to the disclosed exemplary embodiments. The scope of the following claims is to be accorded the broadest interpretation to encompass all such modifications and equivalent structures and functions.

This application claims the benefit of Japanese Patent Application No. 2021-155782 filed on Sep. 24, 2021, which are hereby incorporated by reference herein in its entirety.

What is claimed is:

1. A method of installing a camera unit including an imaging device and an optical system that forms an optical image on a light receiving surface of the imaging device,
wherein the light receiving surface includes a first area and a second area on a peripheral side of the first area,
wherein an increase in an image height with respect to a unit half angle of view in the first area is larger than an increase in an image height with respect to a unit half angle of view in the second area,
wherein the optical system and the imaging device are disposed such that the gravity center of the first area deviates in a first direction from the center of the light receiving surface,
wherein the method includes installing the camera unit such that the first direction is directed to an area other than a predetermined targeted area, and
wherein the following inequality is satisfied:

$$1.0 < f \times \sin\theta\, max/y(\theta\, max) \leq 1.9$$

where f represents a focal distance of the optical system, θmax represents a maximum half angle of view of the optical system, y represents an image height on an imaging surface, and y(θ) represents a projection characteristic indicating a relationship between the image height y and the half angle of view θ.

2. The method of installing a camera unit according to claim 1, wherein distortion of the optical system corresponding to the first area is smaller than distortion of the optical system corresponding to the second area.

3. The method of installing a camera unit according to claim 2, wherein, when a focal distance of the optical system is denoted by f, a half angle of view is denoted by θ, an image height on an imaging surface is denoted by y, and a projection characteristic indicating a relationship between the image height y and the half angle of view θ is denoted by y(θ), a value of y(θ) in the low-distortion area is greater than f×θ.

4. The method of installing a camera unit according to claim 1, wherein a projection characteristic of the optical system corresponding to the first area and a projection characteristic of the optical system corresponding to the second area are different from each other.

5. The method of installing a camera unit according to claim 1, wherein the imaging device is configured to sequentially perform photoelectric conversion row by row in a second direction from pixels in a predetermined row out of a plurality of pixels in the imaging device, and the first direction is a direction opposite to the second direction.

6. The method of installing a camera unit according to claim 1, comprising installing the camera unit in a movable object such that the first direction is directed upward with respect to a horizontal plane.

7. The method of installing a camera unit according to claim 1, comprising installing the camera unit in a movable object such that the first direction is directed toward the movable object, wherein the first direction includes a component of a horizontal direction.

8. The method of installing a camera unit according to claim 1, comprising installing an optical axis of the optical system such that the optical axis is directed to a horizontal direction or downward with respect to the horizontal direction.

9. The method of installing a camera unit according to claim 8, comprising installing the optical axis of the optical system such that the optical axis is directed to downward in a vertical direction.

10. The method of installing a camera unit according to claim 1, wherein the camera unit includes a storage unit configured to store information of a position and a posture of the camera unit.

11. A moving device comprising:
a camera unit; and
a movable object body in which the camera unit is installed,
wherein the camera unit includes an imaging device and an optical system that forms an optical image on a light receiving surface of the imaging device,
wherein the light receiving surface includes a first area and a second area on a peripheral side of the first area
wherein an increase in an image height with respect to a unit half angle of view in the first area is larger than an increase in an image height with respect to a unit half angle of view in the second area,
wherein the optical system and the imaging device are disposed such that the gravity center of the first area deviates in a first direction from the center of the light receiving surface, and
wherein the camera unit is installed such that the first direction is directed to an area other than a predetermined targeted area, and
wherein the following inequality is satisfied:

$$0.1 < f \times \sin\theta\, max/y(\theta\, max) \leq 1.9$$

where f represents a focal distance of the optical system, θmax represents a maximum half angle of view of the optical system, y represents an image height on an imaging surface, and y(θ) represents a projection characteristic indicating a relationship between the image height y and the half angle of view θ.

12. The moving device according to claim 11, wherein the camera unit is disposed such that the first direction is directed upward with respect to a horizontal plane.

13. The moving device according to claim 11, wherein the camera unit is installed such that the first direction is directed to the mobile object body, and the first direction includes a component of a horizontal direction.

14. An image processing system comprising:
a camera unit; and
at least one processor or circuit configured to function as an image processing unit configured to process an image signal acquired from the camera unit on the basis of information of a position and a posture of the camera unit, wherein the camera unit includes
an imaging device and an optical system that forms an optical image on a light receiving surface of the imaging device,
wherein the light receiving surface includes a first area and a second area on a peripheral side of the first area
wherein an increase in an image height with respect to a unit half angle of view in the first area is larger than an increase in an image height with respect to a unit half angle of view in the second area,
wherein the optical system and the imaging device are disposed such that the gravity center of the first area deviates in a first direction from the center of the light receiving surface,
wherein the camera unit is installed such that the first direction is directed to an area other than a predetermined targeted area, and
wherein the following inequality is satisfied:

$$1.0 < f \times \sin\theta\max / y(\theta\max) \leq 1.9$$

where f represents a focal distance of the optical system, θmax represents a maximum half angle of view of the optical system, y represents an image height on an imaging surface, and y(θ) represents a projection characteristic indicating a relationship between the image height y and the half angle of view θ.

15. The image processing system according to claim 14, wherein the image processing unit performs distortion correction on an image signal from the imaging device on the basis of characteristic information of the optical system.

16. The image processing system according to claim 14, wherein the image processing unit is configured to perform image recognition on an image signal from the imaging device.

17. The image processing system according to claim 16, wherein the image processing unit is configured to generate a composite image by synthesizing image signals from a plurality of the camera units and performs the image recognition on the composite image.

18. The image processing system according to claim 17, wherein imaging areas of at least two camera units overlap each other.

* * * * *